United States Patent
Shankle et al.

(10) Patent No.: US 6,540,245 B1
(45) Date of Patent: Apr. 1, 2003

(54) BOAT TRAILER APPARATUS AND METHODS OF USE

(76) Inventors: Lester Shankle, 12395 Carleton Dr., Mishawaka, IN (US) 46545; Joseph J. Sorocco, Jr., 5534 Colonial La., South Bend, IN (US) 46614

( * ) Notice: Subject to any disclaimer, the term of this patent is extended or adjusted under 35 U.S.C. 154(b) by 0 days.

(21) Appl. No.: 09/527,701

(22) Filed: Mar. 16, 2000

(51) Int. Cl.$^7$ ................................................. B60P 3/10
(52) U.S. Cl. ............................... 280/414.1; 280/414.3
(58) Field of Search ......................... 280/414.3, 414.1, 280/789, 785, 786, 796, 797, 798, 47.331

(56) References Cited

U.S. PATENT DOCUMENTS

| | | | |
|---|---|---|---|
| 2,536,563 A | 1/1951 | Montgomery | 214/65 |
| 2,540,279 A | 2/1951 | Mosier | 280/33.4 |
| 2,562,596 A | 7/1951 | Bonfietti | 214/65 |
| 2,625,372 A | 1/1953 | Yerian | 254/139.1 |
| 2,667,984 A * | 2/1954 | Proehl | |
| 2,745,567 A | 5/1956 | Groves | 214/506 |
| 2,772,010 A * | 11/1956 | Buehring | |
| 2,777,712 A * | 1/1957 | Linneman | |
| 2,844,383 A * | 7/1958 | Deeter | |
| 2,893,580 A * | 7/1959 | Fischer | |
| 3,068,024 A * | 12/1962 | Berliner | |
| 3,295,864 A | 1/1967 | Norrby | 280/414 |
| 3,348,874 A | 10/1967 | Gorman | 296/23 |
| 3,540,610 A * | 11/1970 | Pontani | |
| 3,955,830 A | 5/1976 | Hardwick | 218/414 |
| 4,029,227 A * | 6/1977 | Martinez | 280/414.3 |
| 4,362,316 A | 12/1982 | Wright | 280/656 |
| 4,758,008 A | 7/1988 | Moddejonge | 280/37 |
| 4,786,073 A | 11/1988 | Harper | 280/656 |
| 4,795,178 A | 1/1989 | Nabarrete | 280/47.13 |
| 4,830,387 A * | 5/1989 | Batten | 280/47.331 |
| 5,176,394 A | 1/1993 | Veazey | 280/414.2 |
| 5,320,371 A | 6/1994 | Levad | 280/204 |
| 5,393,083 A | 2/1995 | Mally | 280/414.1 |

\* cited by examiner

*Primary Examiner*—Brian L. Johnson
*Assistant Examiner*—Christopher Bottorff
(74) *Attorney, Agent, or Firm*—Dunlap, Codding & Rogers, P.C.

(57) ABSTRACT

A collapsible trailer apparatus and methods of use and more particularly to a boat trailer having a boat storage space below a rigid frame. The boat trailer may also be collapsible and can be used to transport boats of varying sizes and shapes between lakes and camps without the need to empty the boat of any contents. The collapsible boat trailer can be broken down into a plurality of smaller components that are readily stored and transported. The present invention also particularly pertains to a boat trailer apparatus which may be collapsible and which is uniquely suited for short distance motorized vehicle towing. The collapsible boat trailer apparatus can be quickly disassembled without the use of bulky and/or numerous tools into lightweight sub-components for convenient storage and transport.

8 Claims, 4 Drawing Sheets

BOAT TRAILER APPARATUS AND METHODS OF USE

BACKGROUND OF THE INVENTION

1. Field of the Invention

The present invention relates to a collapsible trailer apparatus and methods of use and more particularly to a boat trailer having a boat storage space below a rigid frame. The boat trailer may also be collapsible and can be used to transport boats of varying sizes and shapes between lakes and camps without the need to empty the boat of any contents. The collapsible boat trailer can be broken down into a plurality of smaller components that are readily stored and transported. The present invention also particularly pertains to a boat trailer apparatus which may be collapsible and which is uniquely suited for short distance motorized vehicle towing. The collapsible boat trailer apparatus can be quickly disassembled without the use of bulky and/or numerous tools into lightweight sub-components for convenient storage and transport.

2. Brief Description of the Related Art

Since the advent of the motorized vehicle, sportsmen and recreational boat users have oftentimes desired a convenient and mechanically simple apparatus to transport a boat from place to place. To meet this need, numerous boat trailers have been invented, manufactured, and sold to the general public which provide means for the motorized transport of a boat. Thus, the use of boat transport trailers is well known in the art.

Historically these boat transport trailers have been little more than wheeled support platforms upon which a boat was placed and hauled from one location to another. Although there have been countless different wheeled support platforms, most, if not all, consist basically of familiar and obvious structural configurations. Typically these structural configurations consist of two wheels, a frame, and a placement and/or locking mechanism which holds the boat hull and provides stability to the boat when the wheeled support platform is in use. Depending on whether the boat hull was a v- or tri-hull, the placement and locking mechanism could consist of two or more members, oftentimes covered with rubber or outdoor carpeting to protect the hull from contact with these placement and/or locking members.

When using these wheeled platforms, the task of placing the boat on top of the trailer is cumbersome, requires the operator to immerse themselves at least partially in the water, and also necessitates deft maneuvering of both the motorized vehicle and the bow of the boat. Oftentimes, operators have to engage in successive attempts to place the boat and wheeled platform in proper alignment. This alignment procedure is fraught with difficulties and is, in most cases, nothing more than an exercise in trial and error.

Storage of these wheeled support platforms is also cumbersome and can be quite financially taxing due to their bulky size and shape. The wheeled support platforms require extensive maintenance and cannot be subjected to prolonged exposure to the atmosphere and during the off-season, most users are required to find suitable indoor storage for the wheeled support platforms.

The present invention is directed to a unique and novel boat trailer especially suited for towing a small and lightweight recreational boat thereunder, although the present invention may also be used with any size, shape, or weight of boat. The present invention is also useful in that the boat does not have to be emptied of its contents during transport. Thus, the present invention does not require the user to exert substantial energy, skill, or effort in towing the boat small distances between lakes and/or rivers.

The present invention also includes a collapsible boat trailer superior to known collapsible boat trailers. For example, U.S. Pat. No. 5,393,083 to Mally discloses a collapsible boat trailer which may be collapsed for storage and/or shipment and which may be used to tow a small, lightweight boat short distances. The Mally boat trailer, however, discloses that the boat be placed on top of the trailer and thereby requires tremendous effort of the user to coax the boat upon the trailer. Furthermore, the Mally boat trailer does not provide a secure means for securing the boat to the trailer. A boat which is placed upon the Mally trailer is prone to shift into incorrect alignment and/or weight distribution, resulting in substantial damage to any boat placed upon the Mally trailer.

The prior art also discloses U.S. Pat. No. 3,955,830 to Hardwick which discloses a foldable boat trailer which may be collapsed for storage or shipment and which may be used to suspend a boat thereunder for transporting a boat from one location to another. The boat trailer disclosed in Hardwick, however, awkwardly places the wheels in the center of the trailer, thereby skewing the balance and weight distribution of a boat suspended thereunder. A boat suspended from the Hardwick trailer would have a tendency to fall forward or rearward and would not be substantially stable at higher speeds of towing. Indeed, the Hardwick trailer is especially suited for such forward and rearward tilt due to its intended use for long, slender sailing craft. Furthermore, the disclosure does not show a way to positively secure and cradle the boat to the trailer for safe and effective towing behind a vehicle.

The prior art also discloses folding and foldable trailers as shown in U.S. Pat. No. 4,362,316 to Wright, U.S. Pat. No. 4,758,008 to Modddejonge, and U.S. Pat. No. 4,786,073 to Harper. While these devices fulfill their respective and particular objectives and requirements, the aforementioned patents do not disclose a boat trailer wherein the boat is suspended from the trailer in such a manner that the contents of the boat do not have to be removed prior to the boat being towed. Furthermore, none of the boat trailers of the prior art disclose a boat trailer that is easily maneuverable and quickly assembled with none or few tools and which can be adapted to a variety of boat structures and sizes.

In this respect, the boat trailer of the present invention substantially departs from the prior art boat trailer apparatuses as well as conventional boat trailer structure and design. Therefore, it can be appreciated that there exists a need for a lightweight boat trailer apparatus which can be used to transport a multitude of boat structures and sizes.

It is also an object of the present invention, to provide a collapsible boat trailer that is easily articulated without the need for substantial use of tools and which can be easily manipulated and articulated by a user in a recreational setting as well as methods of use.

Thus, the present invention achieves its intended purposes, objects, and advantages through a new, useful and unobvious combination of components and method steps with the use of a minimum number of functioning parts, a minimum amount of user interaction, and at a reasonable cost to manufacture, and by employing only readily available materials. These and other objects, purposes, and advantages of the present invention will be disclosed in light of the specification, drawings, and claims appended hereto.

SUMMARY OF THE INVENTION

The present invention is defined by the appended claims with the specific embodiments shown in the attached drawings. For the purpose of summarizing the invention, without limiting the invention to such a summary, the invention can be described as a collapsible boat trailer apparatus for towing a boat wherein the boat is suspended from the trailer apparatus and wherein further the trailer apparatus is readily collapsible into several sub-components in a manner requiring few if any tools.

The present invention more particularly relates to a collapsible trailer apparatus and methods of use and even more particularly to a boat trailer having a boat storage space below a rigid frame. The boat trailer may also be collapsible and can be used to transport boats of varying sizes and shapes between lakes and camps without the need to empty the boat of any contents. The collapsible boat trailer can be broken down into a plurality of smaller components that are readily stored and transported. The present invention also particularly pertains to a boat trailer apparatus which may be collapsible and which is uniquely suited for short distance motorized vehicle towing. The collapsible boat trailer apparatus can be quickly disassembled without the use of bulky and/or numerous tools into lightweight sub-components for convenient storage and transport.

DETAILED DESCRIPTION OF THE INVENTION

Figure 1:
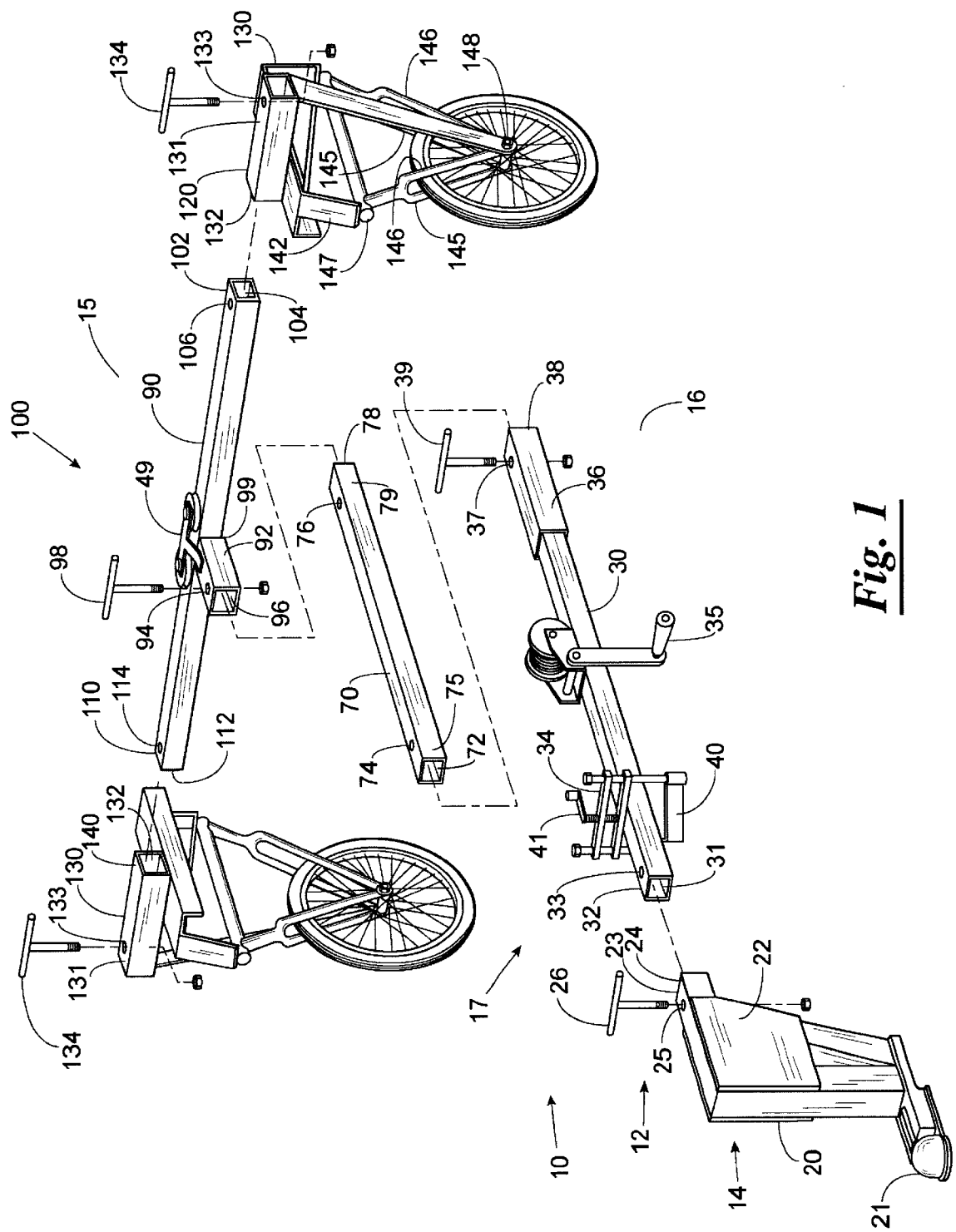
FIG. 1 is a perspective view of the disassembled boat trailer apparatus of the present invention and shows, via a short and long dashed line, the general means and methods of connecting the disassembled parts.

One embodiment of the boat trailer apparatus of the present invention is shown generally in its unassembled state in FIG. 1 and referenced by numeral 10. The boat trailer apparatus 10 is constructed from a rigid frame 12 having a forward end 14, a rearward end 15, a first side 16, and a second side 17. The rigid frame 12 of the boat trailer apparatus 10 can be generally described as having six (6) main components: a hitch assembly 20, a first support member 30, a second support member 70, a spacing member 90, a first wheel assembly 120, and a second wheel assembly 140. When assembled, these six (6) main components constitute the boat trailer apparatus 10 of the present invention. Generally, the assembly of the boat trailer apparatus 10 is indicated in FIG. 1 by the long-and-short dashed line and the boat trailer apparatus 10 is shown in its substantial complete and assembled state in FIG. 2. The rigid frame 12 may be constructed of any material, but it is contemplated that the rigid frame be constructed out of steel, aluminum, fiberglass, copper lead and any combinations of these materials.

The hitch assembly 20 includes a hitch adapter 21, a step up member 22, and a coupling adapter 23. In FIG. 1 the hitch adapter 21 is shown as being a ball hitch adapter although it is contemplated that the hitch adapter 21 can be any mechanical device which is capable of connecting the rigid frame 12 of the boat trailer apparatus 10 to a motorized towing vehicle (not shown). For example, but not by way of limitation, the hitch adapter 21 may be capable of attaching to a fifth wheel hitch found in the bed of pickup truck. One of ordinary skill in the art will appreciate that the design of the hitch adapter 21 is solely limited by the design of the hitch which is attached to the motorized towing vehicle (not shown) that is to be used with the boat trailer apparatus 10. The step up member 22 of the hitch assembly 20 raises the plane of the boat trailer apparatus 10. In one embodiment, it is contemplated that the step up member 22 of the hitch assembly 20 raise the plane of the boat trailer apparatus 10 approximately 15 to 30 inches above the plane in which the hitch of the towing vehicle resides. More particularly, it is contemplated that the step up member 22 of the hitch assembly 20 raises the plane of the boat trailer apparatus 10 approximately 18 to 24 inches above the plane in which the hitch of the towing vehicle resides. In any event, it should be appreciated that the step up member 22 of the hitch assembly 20 raises the plane of the boat trailer apparatus 10 to an appreciable extent above the plane of the hitch of the motorized towing vehicle in order to create a boat storage space 18 (shown in FIG. 2) under the rigid frame 12 of the boat trailer apparatus 10.

The coupling adapter 23 of the hitch assembly 20 is sized and shaped so as to accept a first coupling adapter 31 of the first support member 30. As shown in FIG. 1, the coupling adapter 23 of the hitch assembly 20 has a female configuration while the first coupling adapter 31 of the first support member 30 has a male configuration. When joined, the first coupling adapter 31 of the first support member 30 matingly engages the coupling adapter 23 of the hitch assembly 20 such that an interior surface 24 of the coupling adapter 23 is adjacent an exterior surface 32 of the first coupling adapter 31 of the first support member 30. Thus, the first coupling adapter 31 of the first support member 30 fits within the coupling adapter 23 of the hitch assembly 20. Of course, one of ordinary skill in the art would appreciate that the configuration of the coupling adapter 23 and the first coupling adapter 31 can be switched: i.e. the coupling adapter 23 can have a male configuration while the first coupling adapter 31 can have a female configuration.

Figure 2:
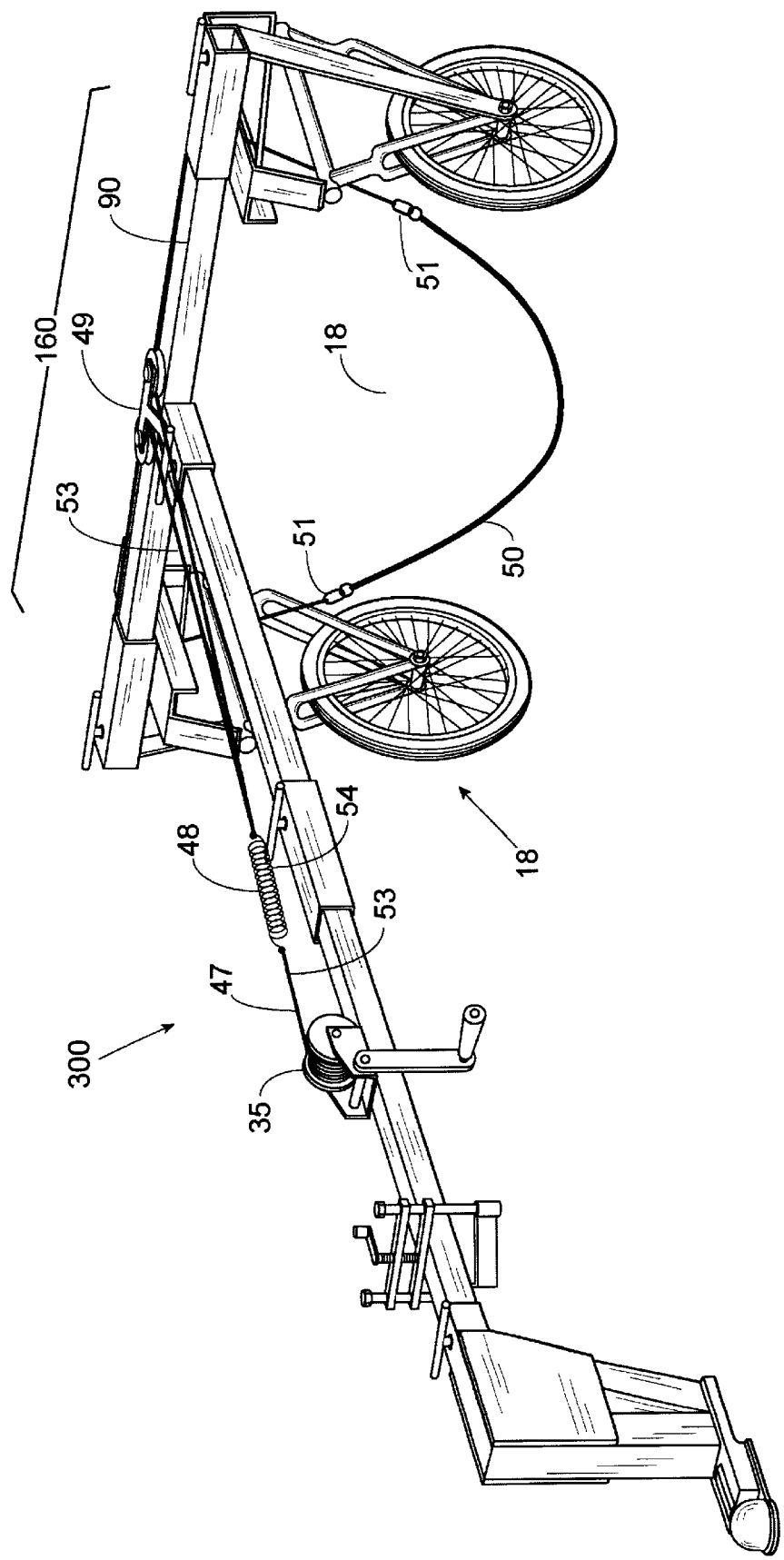
FIG. 2 is a perspective view of the assembled boat trailer apparatus of the present invention.

The first coupling adapter 31 of the first support member 30 fits within the coupling adapter 23 of the hitch assembly 20 so that a connection slot 25 in the coupling adapter 23, which allows access through the coupling adapter 23, aligns with a first connection slot 33 in the first coupling adapter 31, which allows access through the first coupling adapter 31. A first connection bolt 26 is then placed through both the connection slot 25 of the coupling adapter 23 and the first connection slot 33 of the first coupling adapter 31. Of course, one of ordinary skill in the art would appreciate that the first connection bolt 26 may, in practice, be a carriage bolt, a cotter pin or any other suitable fastening device which can be assembled and disassembled quickly and easily yet still provide a sturdy and reliable connection between the hitch assembly 20 and the first support member 30. In FIG. 2, for example, the first connection bolt 26 is a "T" connector.

The first support member 30 is shown in FIG. 1 as including the first coupling adapter 31, having the exterior surface 32 and the first connection slot 33, a bow securing assembly 34, a stem securing winch 35, a second coupling adapter 36, a second connection slot 37, an interior surface 38, and a second connection bolt 39.

The bow securing assembly 34, as shown in FIG. 1, may be, and is shown as, a combination of several elements. First, the bow securing assembly 34 includes a bow support member 40 which is sized and shaped so as to catch and engage a bow lip 43 of a bow 42 of a boat 46 which is shown more particularly in FIG. 3. The bow support member 40 engages a bottom surface 45 of the bow lip 43. Second, a bow support tensioning member 41 allows the bow support member 40 to be drawn up and toward the first support member 30 thereby bringing an upper surface 44 of the bow lip 43 into close proximity with the underside of the first support member 30. In this manner, the bow 42 of the boat 46 is secured to the first support member 30 and the bow 42 of the boat 46 is placed substantially adjacent an underside 200 of the first support member 30. Although one specific embodiment of the bow securing assembly 34 is shown in FIG. 1, namely, a biasing turnbuckle screw assembly, one of ordinary skill in the art would appreciate that the bow securing assembly 34 may comprise any device which secures the bow 42 of the boat 46 substantially adjacent the underside 200 of the first support member 30. For example, but not by way of limitation, the bow securing assembly 34 may consist of a single bolt which fits within a predrilled or prefabricated slot in the bow 42 of the boat 46 and releasably fastens directly to the first support member 30.

The first support member 30 further includes the second coupling adapter 36 having the second connection slot 37, the interior surface 38 and the second connection bolt 39. The second coupling adapter 36 is sized and shaped so as to releasably connect to the second support member 70 which has a first end 72 having a first connection slot 74 and an exterior surface 75, and a second end 76 having a second connection slot 78 and an exterior surface 79. The second coupling adapter 36 may have a female configuration as shown in FIG. 1 and the first end 72 of the second support member 70 may have a male configuration. In these configurations, the first end 72 of the second support member 70 matingly engages the second coupling adapter 36 of the first support member 30. In this manner, the exterior surface 75 of the first end 72 of the second support member 70 is substantially adjacent to the interior surface 38 of the second coupling adapter 36 of the first support member 30. When the first support member 30 and the second support member 70 are joined in this manner, the first connection slot 74 of the first end 72 of the second support member 70 is in substantial alignment with the second connection slot 37 of the second coupling adapter 36 of the first support member 30. As configured as such, the second connection bolt 39 is inserted into the substantially aligned first connection slot 74 and the second connection slot 37 and releasably tightened. In this manner, the first support member 30 is releasably connected to the second support member 70. Although shown in a female to male configuration, the first support member 30 and the second support member 70 may be connected such that the second coupling adapter 36 and the first end 72 are in a male to female configuration, respectively. It would be well within the realm of one of ordinary skill in the art, given this disclosure, to make such a change in configuration.

Figure 3:
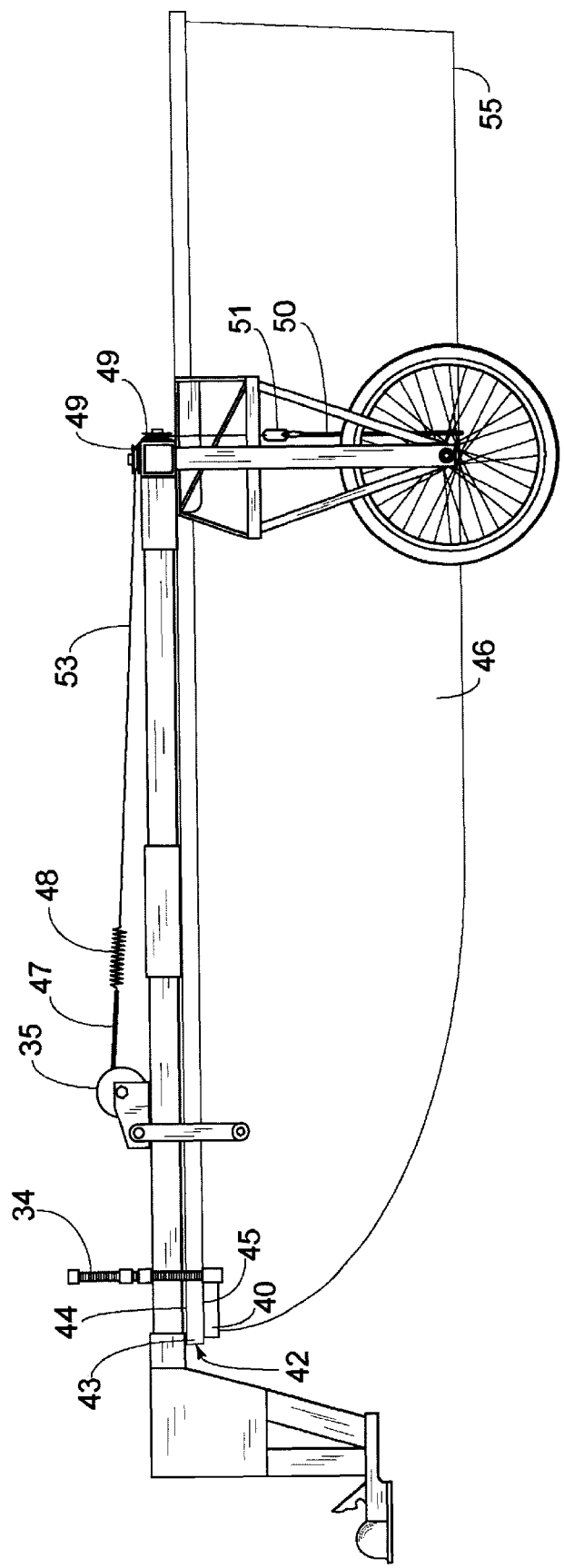
FIG. 3 is a side elevational view of the assembled boat trailer apparatus of the present invention and shows, in particular, the use of the boat trailer apparatus with a boat suspended thereunder.

The first support member 30 also includes the stem securing winch 35 which is affixed to an upperside 300 of the first support member 30. In alternative embodiments (not shown) the stem securing winch 35 may be operably associated with either the hitch assembly 20 or the second support member 70. The stern securing winch 35 is operably associated with a tensioning assembly 47, shown in FIG. 2. The tensioning assembly 47 allows for the boat 46 to be supported under the boat trailer apparatus 10 in the boat storage space 18 which is generally defined as the area underneath the first support member 30, the second support member 70, and the spacing member 90. The tensioning assembly 47 has a tensioning member 48, at least three weight distribution assemblies 49, an adjustable support band 50, and at least two quick connects 51. As shown in FIGS. 1, 2 and 3, the tensioning member 48 comprises a cable 53 and a spring 54. Although the spring 54 is shown in FIGS. 1, 2 and 3 as being closely adjacent the stem securing winch 35, one of ordinary skill in the art will appreciate that the spring 54 may be placed at any point along the cable 53 as long as the spring 54 is capable of providing flexibility and shock absorbability to the cable 53.

Figure 4:
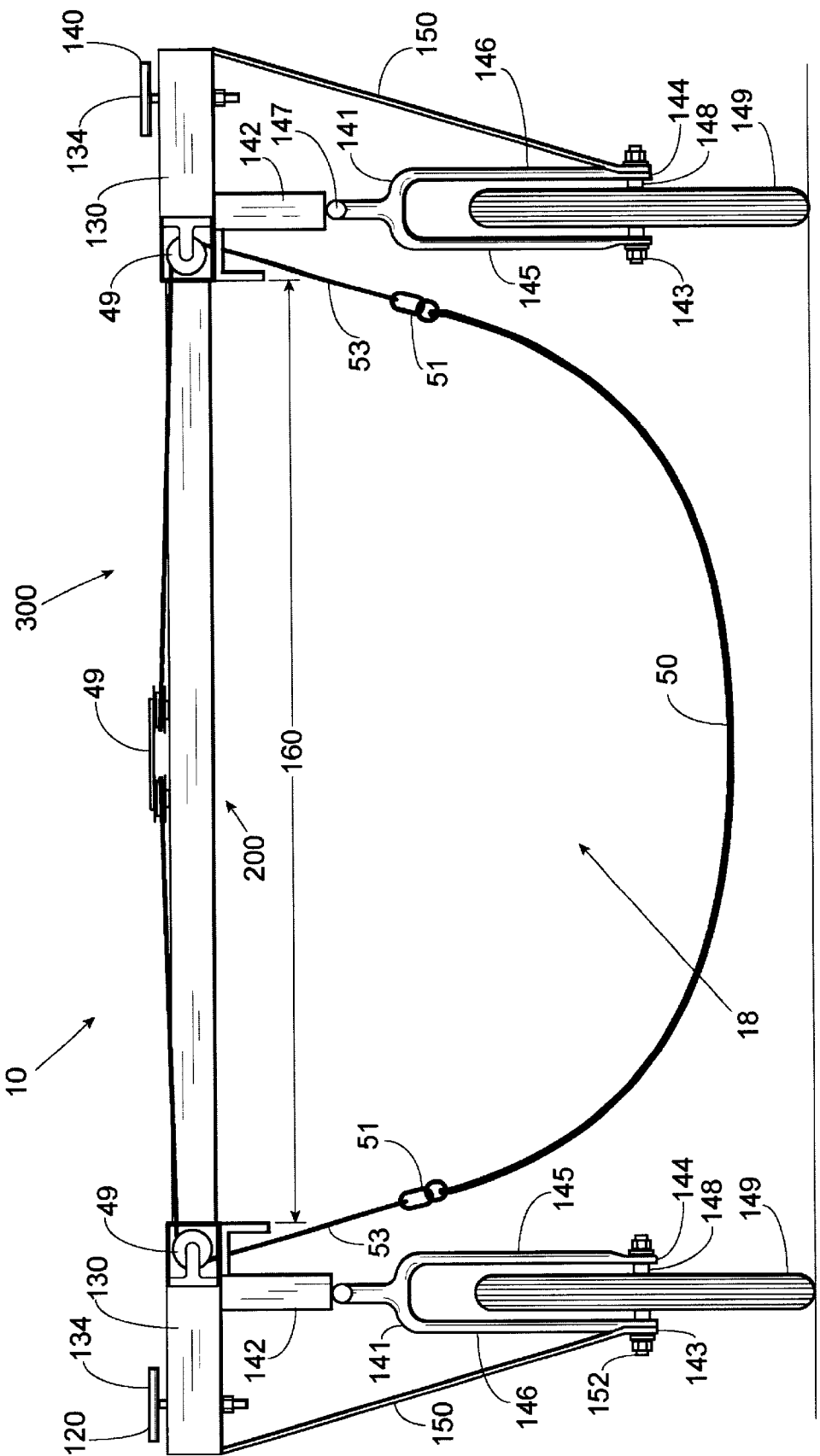
FIG. 4 is a rear elevational view of the assembled boat trailer apparatus of the present invention and shows, in particular, the wheel assemblies, the hull retaining space, and the weight distribution assembly of the boat trailer apparatus.

The cable 53 extends from the stem securing winch 35 to the weight distribution assemblies 49, each of which is generally marked with reference numeral 49. As can be appreciated from FIGS. 1, 2, 3, and 4, the weight distribution assemblies 49, in one embodiment, are a plurality of pulleys. In an alternative embodiment, not shown, the weight distribution assemblies 49 may be additional springs which are placed in curving tubes into or onto the rigid frame 12. In any event, the weight distribution assemblies 49 and the cable 53 provide the ability for raising and lowering the adjustable support band 50 and allow a stern portion 55 of the boat 46, as shown in FIGS. 3 and 4, to be raised from a lowered position to a raised position.

As mentioned above, the tensioning assembly 47 includes the adjustable support band 50 and the at least two quick connects 51. The adjustable support band 50 fits underneath the stern portion 55 of the boat 46 and acts as a cradle. When the adjustable support band 50 is raised to its raised position, as shown in FIG. 31 the stern portion 55 of the boat 46 is suspended off of the ground which is indicated generally by the solid line in FIG. 4 The two quick connects 51 are any mechanical device capable of quickly and releasably connecting the cable 53 to the adjustable support band 50. For example, but not by way of limitation, the quick connects 51 may be c-clamps or carabineers, i.e. mechanical devices which can connect two pieces of cable 53 together while allowing for quick release of the cable 53. It is contemplated that the support band 50 may be constructed from a web of material, chain, rubber tubing, rope and any combination of these materials.

In operation, the adjustable support band 50 may be hand positioned under the stern portion 55 of the boat 46 and thereafter the adjustable support band 50 would be connected to the at least two quick connects 51. The stern portion 55 of the boat 46 would then be raised to its raised condition by manipulating the stern securing winch 35 so as to wind up and/or gather up the tensioning assembly 47, as shown in FIG. 3. Alternatively, the adjustable support band 50 may be left connected to the rigid frame 12 via the quick connects 51 and either the boat 46 can be manipulated through the boat storage space 18 or the rigid frame 12 can be manipulated forward or backward so that the boat 46 is placed within the boat storage space 18. In any event, it should be appreciated that the adjustable support band 50 cradles the stern portion 55 of the boat 46 and urges the stern portion 55 of the boat 46 up to and adjacent the underside of the rigid frame 12.

The second support member 70 may be of any length and is generally sized and shaped to fit the particular length of the boat 46 that is to be towed. Indeed, the boat trailer apparatus 10 of the present invention may consist of a kit wherein several different sizes of the second support member 70 are provided. If provided with such a kit, the operator would be required to judge the overall length of the second support member 70 that is required and select and use the length appropriate for the task.

The second support member 70, as mentioned above, also has the second end 76 which includes the second connection slot 78 and the exterior surface 79. Upon inspection of FIG. 1, it can be appreciated that the exterior surface 75 of the first end 72 of the second support member 70 is essentially the same as the exterior surface 79 of the second end 76 of the second support member 70. One of ordinary skill in the art would appreciate that these two exterior surfaces would always be one and the same, unless the end configurations of the second support member 70 were opposing: for example, if one end was in a female configuration and another end was in a male configuration. For purposes of illustration, however, the second support member 70 is shown as having both the first end 72 and the second end 76 in the male configuration and thus the exterior surface 75 of the first end 72 is the same as the exterior surface 79 of the second end 76.

The second support member 70 connects to the spacing member 90, generally as shown by the long and short dashed line in FIG. 1. In particular, the second end 76 of the second support member 70 releasably interconnects with a stem member 92 of the spacing member 90. The stem member 92 of the spacing member 90 includes a connection slot 94, an interior surface 96 and a connection bolt 98. As shown in FIG. 1, the second end 76 of the second support member 70 and the stem member 92 of the spacing member 90 are in a male to female configuration, respectively. As outlined above for the first end 72 of the second support member 70 and the second coupling adapter 36 of the first support member 30, the male to female configuration of the second end 76 of the second support member 70 and the stem member 92 of the spacing member 90 may be reversed to a female to male configuration, respectively. As shown in FIG. 1, when connected the male configuration is inserted into the female configuration, i.e. the exterior surface 79 of the second end 76 of the second support member 70 is substantially adjacent the interior surface 96 of the stem member 92 of the spacing member 90, respectively. Also, the second connection slot 78 of the second end 76 of the second support member 70 is substantially in alignment with the connection slot 94 of the stem member 92 of the spacing member 90. When in alignment, a connection bolt 98 is inserted through the aligned connection slots and releasably fastens the spacing member 90 to the second support member 70.

The stem member 92 is permanently affixed to a cross member 100 of the spacing member 90 via a connection joint 99. The connection joint 99 may be a mechanical, chemical adhesive or combinations of these materials. When so permanently affixed, the stem member 92 and the cross member 100 of the spacing member 90 are in a "T" configuration and are substantially perpendicular to one another. The stem member 92 is affixed to the cross member 100 at approximately the mid-point of the cross member 100. The cross member 100 of the spacing member 90 includes a first end 102 having an interior surface 104 and a connection slot 106, and a second end 110 having an interior surface 112 and a connection slot 114. As can also be seen in FIG. 1 and more especially in FIG. 4, a double set of pulleys, one component of the weight distribution assemblies 49, are located on the cross member 100 of the spacing member 90.

The cross member 100 keeps a first and second wheel assembly, 120, 140 respectively, substantially parallel and a predetermined distance 160 away from one another as shown in FIGS. 2 and 4. The predetermined distance 160 is directly correlative to the length of the cross member 100 and it should be appreciated by one of ordinary skill in the art, that the length of the cross member 100 and consequently the predetermined distance 160 should depend upon the width of the boat 46 to be towed with the boat trailer apparatus 10: i.e., the width of the boat 46 will determined both the length of the cross member 100 as well as the predetermined distance 160.

As shown in FIGS. 1 and 2, the identical first and second wheel assemblies 120, 140, extend downwardly, one from each of the first and second ends 102, 1 10, respectively, of the cross member 100. Each of the first and second wheel assemblies 120, 140 have an upper end 130. The upper ends 130 of each of the first and second wheel assemblies 120, 140 one releasably connected to the cross member 100 through the use of interlocking male to female configuration connections. These male to female configuration connections are similar to the male to female configuration connections that exist between the cross member 100 of the spacing member 90 and the second end 76 of the second support member 70 and may also be arranged in female to male configuration connections as outlined hereinabove. In particular, each of the identical first and second wheel assemblies 120, 140 have an upper end 130 which includes a coupling joint 131 which has an interior surface 132, a connection slot 133, and a connection bolt 134.

With respect to the first end 102 of the cross member 100, the first wheel assembly 120 is releasably connected to the first end 102 of the cross member 100 such that the interior surface 104 of the first end 102 of the cross member 100 is substantially adjacent the interior surface 132 of the coupling joint 131 of the first wheel assembly 120. When this connection is made, the connection slot 106 of the first end 102 is substantially aligned with the connection slot 133 of the coupling joint 131 of the first wheel assembly 120. A connection bolt 134 is then inserted into the aligned connection slots such that the first end 102 of the cross member 100 is releasably connected to the coupling joint 131 of the first wheel assembly 120.

Since the first and second wheel assemblies 120, 140 are essentially identical, the same procedures are followed to releasably connect the second end 110 of the cross member 100 with the second wheel assembly 140 through the use of the interior surface 112 and the connection slot 114 of the second end 110. When assembled in this manner, the cross member 100 of the spacing assembly 90 is releasably connected to both the first and second wheel assemblies 120, 140. The predetermined distance 160 between the first and second wheel assemblies 120, 140 further defines the sides of the boat storage space 18 with the adjustable support band 50 defining the bottom boundary of the boat storage space 18 and the spacing assembly 90, as well as the first and second support members 30, 70, defining the upper boundary of the boat storage space 18.

Shown best in FIG. 4, first and second wheel assemblies 120, 140 include a wheel fork assembly 141 which is connected to a support member 142 which is connected to the upper ends 130 of each of the first and second wheel assemblies 120, 140. The wheel fork assembly 141 has a facing pair of first and second fork arms 145, 146, which have a facing pair of first and second axle mounting slots 143, 144, respectively, through the lower end thereof. In the embodiment shown best in FIG. 1, the wheel fork assembly 141 has two sets of first and second fork arms 145, 146 which are connected to opposing ends of a stabilization member 147. The stabilization member 147 is then connected to the support member 142 and thereby provides a wider base of stabilization, support and the ability for the entire wheel assembly to withstand outward centrifugal and gravitational forces when in operation.

As shown in FIG. 4, an axle 148 extends transversely across the first and second fork arms 145, 146 of each of the first and second fork arms 145, 146, the ends of the axle 148 extending through the first and second axle mounting slots 143, 144. A wheel 149 is journelled from the axle 148 whereby the boat trailer apparatus 10 may roll across the ground, designated generally by the solid line, when in use. As can also be seen from FIG. 4, in an alternative embodiment, the connection bolts 134, 26, 39, and 98 may consist of a "T" connector. A strengthening member 150 is also provided to connect an outside edge 152 of the upper end 130 of the first and second wheel assemblies 120, 140 in an angular manner to the outside edge 152 of the axle 148. In this manner, the entire first and second wheel assemblies 120, 140 are strengthened and braced against possible movement of the wheel fork assembly 141 inwardly and/or outwardly.

As to the manner of usage and operation of the present invention, the usage of the boat trailer apparatus 10 can best be seen in FIG. 3, wherein the boat 46 is suspended underneath the rigid frame 12 of the boat trailer apparatus 10 in the boat storage space 18 such that the bow 42 of the boat 46 is substantially adjacent the underside 200 of the first support member 30 and the stern portion 55 of the boat 46 is cradled by the adjustable support band 50 as well as being held substantially adjacent the underside 200 of the spacing member 90 and between the first and second wheel assemblies 120, 140 and thus, the manner in which the boat 46 is suspended and held under the rigid frame 12 should be apparent from the above description. Accordingly, no further discussion relating to the manner of usage and operation will be provided.

With respect to the above description, it is to be realized that the optimum dimensional relationships for the parts of the invention include variations in size, materials, shape, form, function and manner of operation. For example, although in one embodiment of the boat trailer apparatus 10 it is contemplated that the rigid frame 12 be constructed of a metal such as steel, the material of choice could vary from other metals, such as aluminum, and the rigid frame 12 may also be constructed from polymers, extruded polymers, laminates of differing materials, fiberglass and so forth. The material of which the rigid frame 12 of the boat trailer apparatus 10 is constructed is only limited by the strength, stability and weight desired. All the different variations of the boat trailer apparatus 10, in light of the present specification, drawings and claims, are deemed readily apparent to one of ordinary skill in the art given the present specification, claims and drawings, and all equivalent relationships to those illustrated in the drawings and described in the specification are intended to be encompassed by the present invention.

Therefore, the foregoing is considered as illustrative of the principles of the invention as well as the preferred embodiment of the invention at the time of filing. Further, since numerous modifications and changes will readily occur to those skilled in the art given the present specification, it is not desired to limit the invention to the exact construction and operation shown and described, and accordingly, all suitable modifications and equivalents may be resorted to, falling within the scope and the broad terms as used herein in the claims and the specification. Although this invention has been described in its preferred forms with a certain degree of particularity, it is understood that the present disclosure of the preferred form has been made only by way of example and numerous changes in the details of construction and combination and arrangement of parts may be resorted to without departing from the spirit and scope of the invention.

What is claimed is:

1. A boat trailer apparatus capable of being assembled and disassembled in an expedient and forthrightly manner, comprising:

a rigid frame having a forward end, a rearward end, a first side, and a second side, the forward end being positioned so as to be substantially perpendicular to the rearward end and the forward end further being attachable to a towing vehicle, and the rigid frame is capable of reversible assembly into at least two subunits;

at least two wheel assemblies connected to the rigid frame in a spaced apart relation so as to cooperate with the rigid frame to define a boat storage space beneath the rigid frame;

a mechanism for reversibly coupling each of the at least two wheel assemblies to the rigid frame so as to permit assembly and disassembly of the at least two wheel assemblies to and from the rigid frame wherein the reversible coupling mechanism comprises a coupling joint, a connection slot, and a connection bolt wherein a portion of the rigid frame having a rigid frame connection slot resides within the coupling joint and the connection slot of the reversible coupling mechanism aligns with the connection slot of the rigid frame and the connection bolt passes through the connection slot of the rigid frame and the connection slot of the reversible coupling mechanism to thereby reversibly attach the at least two wheel assemblies to the rigid frame;

an adjustable support band extending from the first side to the second side of the rigid frame, the support band adjustable between a lowered condition wherein the support band is positioned to permit a boat to be selectively moved into and out of the boat storage space and a raised condition wherein the stern of the boat is supported in a suspended condition within the boat storage space; and a bow securing assembly for securing the bow of the boat disposed in the boat storage space to the rigid frame, wherein the bow securing assembly comprises a bow support tensioning member operably attached to a bow support member so that the bow of the boat is held by the bow support member which is drawn up against the rigid frame by the bow support tensioning member to thereby stably hold the bow of the boat against the rigid frame for transport and storage of the boat.

2. The boat trailer apparatus of claim 1, wherein the rigid frame further includes a means for coupling the at least two subunits of the rigid frame so as to permit the assembly and disassembly of the rigid frame.

3. The boat trailer apparatus of claim 2, wherein the rigid frame comprises a material selected from the group consisting of steel, aluminum, fibreglass, copper, lead, and combinations thereof.

4. The boat trailer apparatus of claim 1, wherein the support band is selected from the group consisting of a web of material, chain, rubber tubing, rope, and combinations thereof.

5. A method for towing a boat on a trailer with a motorized towing vehicle, comprising the steps of:

providing a boat having a bow and a stern;

providing a boat trailer, wherein the boat trailer comprises, a rigid frame having a forward end being positioned so as to be substantially perpendicular to a rearward end, a first side, a second side, and the forward end further being attachable to a towing vehicle, and the rigid frame is capable of reversible assembly into at least two subunits;

at least two wheel assemblies connected to the rigid frame in a spaced apart relation so as to cooperate with the rigid frame to define a boat storage space beneath the rigid frame;

a mechanism for reversibly coupling each of the at least two wheel assemblies to the rigid frame so as to permit assembly and disassembly of the at least two wheel assemblies to and from the rigid frame wherein the reversible coupling mechanism comprises a coupling joint, a connection slot, and a connection bolt wherein a portion of the rigid frame having a rigid frame connection slot resides within the coupling joint and the connection slot of the reversible coupling mechanism aligns with the connection slot of the rigid frame and the connection bolt passes through the connection slot of the rigid frame and the connection slot of the reversible coupling mechanism to thereby reversibly attach the at least two wheel assemblies to the rigid frame;

an adjustable support band extending from the first side to the second side of the rigid frame, the support band adjustable between a lowered condition wherein the support band is positioned to permit a boat to be selectively moved into and out of the boat storage space and a raised condition wherein the stern of the boat is supported in a suspended condition within the boat storage space, and a bow securing assembly for securing the bow of the boat disposed in the boat storage space to the rigid frame, wherein the bow securing assembly comprises a bow support tensioning member operably attached to a bow support member so that the bow of the boat is held by the bow support member which is drawn up against the rigid frame by the bow support tensioning member to thereby stably hold the bow of the boat against the rigid frame for transport and storage of the boat;

engaging the adjustable support band and moving the adjustable support band from the lowered condition to the raised condition such that the boat stern in the raised condition is suspended from the rearward end of the rigid frame and is positioned substantially between the at least two wheel assemblies and within the boat storage space;

placing the bow of the boat into the bow securing assembly such that the bow of the boat is drawn up to the rigid frame by engaging the bow support tensioning member; and attaching the boat trailer having the bow and the stern of the boat associated with the rigid frame to the motorized towing vehicle for moving the boat from an initial position to a secondary position.

6. The method of claim 5, wherein in the step of providing a boat trailer, the rigid frame further includes a means for coupling the at least two subunits of the rigid frame so as to permit the assembly and disassembly of the rigid frame.

7. The method of claim 6, wherein in the step of providing a boat trailer, the rigid frame comprises a material selected from the group consisting of steel, aluminum, fibreglass, copper, lead, and combinations thereof.

8. The method of claim 5, wherein in the step of providing a boat trailer, the support band is selected from the group consisting of a web of material, chain, rubber tubing, rope, and combinations thereof.

* * * * *

UNITED STATES PATENT AND TRADEMARK OFFICE
CERTIFICATE OF CORRECTION

PATENT NO.    : 6,540,245 B1                                                 Page 1 of 1
DATED         : April 1, 2003
INVENTOR(S)   : Lester Shankle and Joseph J. Sorocco, Jr.

It is certified that error appears in the above-identified patent and that said Letters Patent is hereby corrected as shown below:

<u>Column 5,</u>
Lines 63 and 66, delete the word "stem" and substitute therefore the word -- stern --.

<u>Column 6,</u>
Lines 13 and 18, delete the word "stem" and substitute therefore the word -- stern --.
Line 36, delete the numeral "31 and substitute therefore the numeral -- 3 --.

<u>Column 8,</u>
Line 15, delete the space after the numeral "1" and before the numeral "10".

Signed and Sealed this

Eighteenth Day of May, 2004

JON W. DUDAS
*Acting Director of the United States Patent and Trademark Office*